US008150418B2

(12) United States Patent
Craine et al.

(10) Patent No.: US 8,150,418 B2
(45) Date of Patent: Apr. 3, 2012

(54) METHODS AND SYSTEMS FOR PROXIMITY-BASED MONITORING OF WIRELESS DEVICES

(75) Inventors: Ari J. Craine, Marietta, GA (US); John P. Ruckart, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 556 days.

(21) Appl. No.: 11/692,323

(22) Filed: Mar. 28, 2007

(65) Prior Publication Data

US 2008/0242311 A1 Oct. 2, 2008

(51) Int. Cl.
*H04W 74/00* (2009.01)

(52) U.S. Cl. ............... 455/456.1; 455/456.2; 455/456.3; 455/456.4; 455/456.5

(58) Field of Classification Search ..... 455/456.1–456.3
See application file for complete search history.

(56) References Cited

U.S. PATENT DOCUMENTS 5,590,043 A * 12/1996 McBurney .................... 701/207
5,825,283 A 10/1998 Camhi
6,031,484 A * 2/2000 Bullinger et al. ............... 342/72
6,192,309 B1 * 2/2001 Prestl et al. ...................... 701/93
6,385,454 B1 * 5/2002 Bahl et al. ...................... 455/450
6,644,688 B1 * 11/2003 Hu et al. ........................ 280/735
7,302,266 B1 * 11/2007 Sill et al. ........................ 455/441
2005/0118983 A1 * 6/2005 Van Camp ................. 455/404.2
2005/0190158 A1 * 9/2005 Casebolt et al. .............. 345/166
2005/0272441 A1 * 12/2005 Bates et al. ................ 455/456.1
2006/0009234 A1 * 1/2006 Freer .......................... 455/456.1
2006/0052113 A1 * 3/2006 Ophir et al. ................ 455/456.1
2007/0004428 A1 * 1/2007 Morgan et al. ............. 455/456.1
2007/0155387 A1 * 7/2007 Li et al. .......................... 455/441
2007/0232321 A1 * 10/2007 Casati et al. ............... 455/456.1
2007/0282621 A1 * 12/2007 Altman et al. .................... 705/1

* cited by examiner

*Primary Examiner* — Kamran Afshar
*Assistant Examiner* — Edward Zhang
(74) *Attorney, Agent, or Firm* — Parks IP Law LLC; Mickki D. Murray, Esq.

(57) ABSTRACT

Method and apparatus are disclosed for monitoring the geographic location or velocity of a first wireless device relative to at least one other wireless device and noting an exception if the first wireless device moves beyond a predetermined threshold of separation from the second wireless device, or if the velocity of the first wireless device is outside a predetermined threshold. In response to an exception, supervisory action is taken which may include contacting the wireless device or contacting another person.

6 Claims, 3 Drawing Sheets

METHODS AND SYSTEMS FOR PROXIMITY-BASED MONITORING OF WIRELESS DEVICES

FIELD OF THE INVENTION

This application relates in general to management of mobile wireless devices, and more particularly relates to methods and systems for monitoring and supervisory action based on relative geographic locations of at least two wireless devices.

BACKGROUND

Location-based services for mobile wireless devices are only beginning to become adopted. Such mobile wireless devices may include cell phones litigated audio (DAP) or music player, cameras, navigation devices and personal digital assistants (PDAs), as well as more application-specific devices intended for use by service persons and other workers. Cell phones and PDAs are typically small in size, so that the individual user can carry such devices on his or her person, for example, in a belt holster, a backpack, or a book bag. Purpose-specific wireless devices may be incorporated into vehicle-mounted communications equipment or other apparatus used in connection with the service or field visits of the person, although of course service persons may also carry individual cell phones or other wireless devices.

Although the service of tracking geographic locations of wireless devices is known, those services are generally used only to track the locations of individuals such as field service workers or others carrying wireless devices and subscribing to a tracking service. The tracking service may monitor the geographic location of a participating wireless device and report the geographic location of that device to the subscriber concerning, for example, the locations visited from time to time by the user of the wireless device and any entry of the wireless device into so-called red zones, namely, geographic locations that the service subscriber has declared as off-limits to the user, so that the subscriber may later take action as deemed appropriate. In the case of application-specific wireless devices, such devices may monitor additional inputs, such as vehicle speed and ignition on-off status, and periodically report that additional information for supervisory attention. However, such prior systems are not known that can associate a first wireless device by the location of that device relative to the location of at least one other device, for example, a wireless device carried by someone responsible for the whereabouts or movement of the person carrying the first wireless device.

SUMMARY

Stated in general terms, a system according to embodiments of the present invention determines and monitors the geographic locations of at least a first wireless device relative to a second device and compares the respective geographic locations of those devices. All such devices may be wireless devices, as discussed below. The determined geographic locations of the first and second devices are compared, and an exception is determined if the comparison indicates that the first wireless device fails to have a predetermined geographic relation to the second device. For example, that exception can occur if the difference in geographic location of the first wireless device relative to the location of the second device exceeds a predetermined amount of separation between the two devices, suggesting that the person carrying the first wireless device has moved beyond a predetermined maximum separation distance from a caregiver or other monitor associated with the second device. For further example, the system can monitor the speed at which the first wireless device is moving relative to the second wireless device, or the absolute speed of the first wireless device, and determine an exception if that relative speed undergoes a significant increase or if the absolute speed becomes faster than the person carrying the first wireless device could run, which might indicate that the person carrying the first such device is no longer on foot. The extent of relative geographic separation required to determine an exception may be reduced in response to a predetermined increase in the rate of movement of the first wireless device, and the threshold of relative speed may likewise be a function of the relative geographic separation. Alternative to determining an exception in response to an increase in the relative movement speed of the first wireless device, the system can determine an exception if the relative movement or speed falls below a threshold which might suggest that the person carrying the first wireless device has become incapacitated or has been separated from that wireless device.

In response to determining an exception, the present system sends an alert to the second wireless device so that the person carrying or otherwise associated with that second device can take immediate on-the-scene action. The system can also take other supervisory actions intended to alert another responsible person, such as a parent or guardian. For example, according to embodiments of the present invention the system may also send a notification signal to the first wireless device to request some response or other action by the person carrying that wireless device. Exception-responsive action may also include sending a message to one or more destinations different from the second wireless device, for example, to notify a parent or guardian that an exception to the relative geographical location of the person carrying the first wireless device has been determined. Such third-party notification may operate in several escalating levels, for example, a first level being notification sent to a parent or guardian, followed by a second level of notification sent to a school principal or administrator if the first-level notification is not acknowledged within a certain time. A further level of notification might, for example, provide an alert to local police and/or a local 911 emergency provider.

Location information of the wireless devices may be obtained by any suitable technique including techniques known in the art, as discussed below. Other systems, methods, and/or computer program products according to embodiments will be or become apparent to one with skilled in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
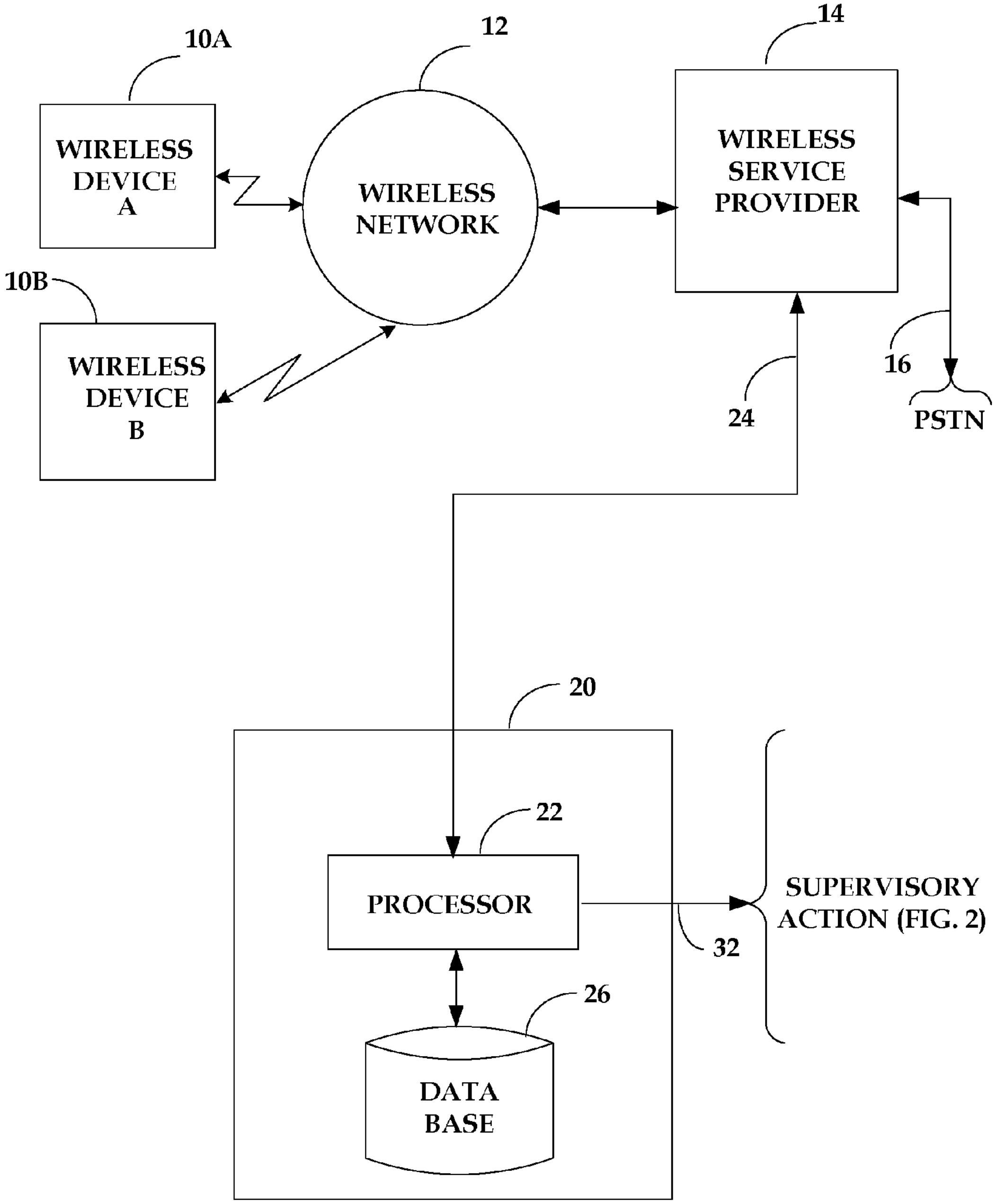
FIG. 1 is a functional block diagram showing monitoring and supervisory management of a wireless device according to a disclosed embodiment of the invention.

FIG. 1 shows in functional terms an apparatus according to a disclosed embodiment for monitoring the relative geographic location of at least two wireless devices, and by extension the relative location of the persons carrying those wireless devices. The wireless devices in that disclosed embodiment are indicated generally at 10A and 10B, and it will be understood that those wireless devices may be cell phones, PDAs equipped for radio communication, or any other wireless device operative for radio communication with a central location or service provider for such wireless devices. It will also become apparent to those skilled in the art that embodiments according to the present invention may monitor the relative geographic locations and movements of more than one wireless device relative to a selected further wireless device.

A wireless network 12 is in radio communication with the two wireless devices 10A and 10B. Where the wireless devices 10A and 10B comprise cell phones, it will be understood that the wireless network 12 comprises a number of cell sites for radio communication with the wireless devices. The wireless network 12 in the depicted embodiment is operated by a wireless service provider 14, which those skilled in the art will understand as including one or more mobile switching centers each of which may serve more than one cell site. The wireless service provider 14 can establish communication between the wireless devices 10A and 10B through the wireless network 12, or between a wireless device and one or more landline phones by the interconnection 16 with the public switched telephone network (PSTN) or with other wired or wireless communications networks such as the Internet and Voice Over Internet Protocol (VOIP).

A monitoring service provider 20 according to the disclosed embodiment provides monitoring services for participating wireless devices 10A and 10B, and receives information from the wireless service provider 14 concerning the identities and geographic locations of those participating wireless devices 10A and 10B. It should be understood that the services and operations of the monitoring service provider 20 may be provided by the wireless service provider 14 or by an entity separate from the wireless service provider 14, although the two service providers 14 and 20 are shown functionally separated in FIG. 1. In either case, the monitoring service provider 20 provides monitoring and administrative functions for subscribers to the service, based on the identifications of the wireless devices 10A and 10B provided to the monitoring service provider 20 by those subscribers. Typical subscribers to the present monitoring and administrative services could be parents or guardians concerned with the security of one or more children, e.g., at a playground or other activity outside the home or other secure location, and other caregivers desiring to monitor locations of elderly or differently-abled persons.

For the following discussion of exemplary embodiments, it is assumed that a first person whose location is being monitored is carrying the wireless device 10A and a second person responsible for that first person is carrying the other wireless device 10B, and that the second person should be alerted if the relative separation between those two persons, as determined by the relative geographic separation between the respective wireless devices 10A and 10B carried by those two persons, becomes greater than an amount of relative separation previously determined as the maximum permissible for the particular situation being monitored. However, it will be understood as mentioned below that an alert condition may be determined by the occurrence of one or more situations other than, or in addition to, relative geographic separation alone. It will also become apparent that the geographic locations of more than one wireless device 10A may be monitored relative to the wireless device 10B, and that more than one wireless device 10B can monitor the relative locations of one or several wireless devices 10A.

The monitoring service provider 20 includes a processor 22 operatively communicating at 24 with the wireless service provider 14, and a database storage device 26 operatively connected to the processor 22 for receiving and storing information identifying particular wireless devices being monitored, including the wireless devices 10A and 10B, and for receiving geographic location information for those wireless devices 10A and 10B. Information concerning the geographic locations of the wireless devices 10A and 10B may be obtained by any technique known in the art. Such geographic location techniques currently include the global positioning system (GPS) relying on satellite information that can be received by GPS-enabled wireless devices 10A and 10B. Other current techniques for locating wireless devices 10A and 10B include, without limitation, time-difference-of-arrival measurement based on signals transmitted by the wireless devices 10A and 10B and received at multiple radio towers of the wireless network 12. Techniques for obtaining and processing geographic location information of cell phones and other wireless devices 10A and 10B are known to those skilled in the art. See, for example, U.S. Pat. No. 7,110,749, assigned to the assignee of the present invention. Whatever the source, the geographic-location information for the wireless devices 10A and 10B is supplied to the processor 22 of the monitoring service provider 20 through any suitable data link 24 include wireless or wireline connections and using Internet Protocol (IP) or any other suitable data-transfer technique.

The processor 22 of the monitoring service 20 is programmed to compare the geographic location information received for the wireless devices 10A and 10B, to determine the relative locations of the wireless devices 10A and 10B, that is, the geographic separation between those wireless devices, and to compare that determined geographic separation with the maximum permissible geographic location information supplied by a subscriber to the service and stored on the database 26, as discussed below. If the comparison of geographic separation indicates that the wireless device 10A is not within the permissible separation relative to the wireless device 10B, the monitoring service provider 20 determines an exception and initiates one or more supervisory action outputs at 32. Examples of such supervisory actions are discussed below with reference to FIG. 2.

Figure 2:
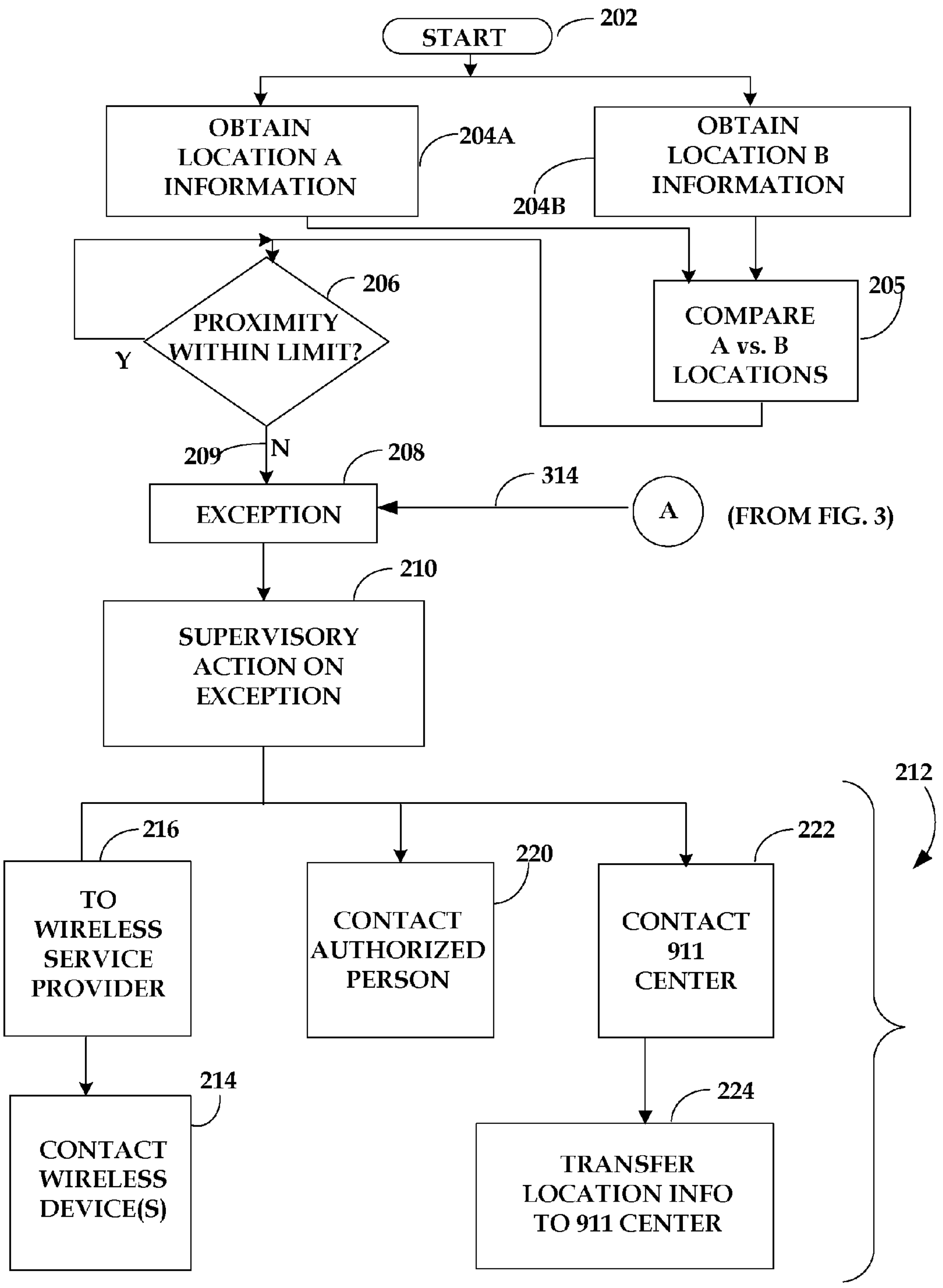
FIG. 2 is a flow chart representing operation of the embodiment according to FIG. 1.

FIG. 2 illustrates an example of monitoring and supervising the wireless devices 10A and 10B according to the embodiment of FIG. 1. At the start 202 of the process illustrated in FIG. 2, it is assumed that a subscriber or account holder of the monitoring service has registered, with the monitoring service provider 20, at least the two wireless devices 10A and 10B whose relative location (and, perhaps, relative or absolute velocity as discussed below) is to be monitored. That registration would typically include providing the unique identifiers of the wireless devices 10A and 10B, such as the unique Manufacturer's Identification Number and/or the telephone number associated with each cell phone whose location is to be monitored, or some other unique identifier such as the IP address in the case of a wireless device communicating over the Internet. Registration with the monitoring service provider would also include identifying at least one geographic parameter of concern to the subscriber. Such geographic parameters could include, for example, the maximum desired geographic separation or relative velocity between the wireless devices 10A and 10B. Furthermore, the subscriber may provide time- or date-relevant information pertaining to one or more locations, dates, or times for monitoring the location of the person carrying the wireless device 10A relative to the person carrying the wireless device 10B. The information furnished to the monitoring service provider 20 by a subscriber is stored on the database 26 by the processor 22.

Referring again to FIG. 2, location information is obtained at 204A from the participating wireless device 10A and at 204B for the participating wireless device 10B. That location information may be obtained at periodic intervals, as is known in the art. Using the obtained location information, the processor 22 of the monitoring service provider 20 at 205 compares the respective geographical locations of the wireless devices 10A and 10B to determine the relative geographic separation between the geographical locations of those two wireless devices 10A and 10B, and at 206 compares that relative separation information with the maximum or threshold relative separation information previously stored in the database 26. That comparison 206 continues unless the comparison of the relative location information shows at 209 that the wireless device 10A has moved beyond the maximum geographic separation from the wireless device 10B. In that latter case, the processor 22 notes an exception at 208 and at 210 initiates one or more predetermined supervisory actions in response to the exception, as shown by the output 32 on FIG. 1. Exemplary supervisory actions according to the embodiment shown in FIG. 2 are identified at 212. For example, the monitoring service provider 20 may at 214 notify the wireless device 10B, working through the wireless service provider 14 for that wireless device as shown at 216. Notifying the wireless device 10B as at 214 may include sending a short audible and/or visual message to appear at the wireless device 10B, or may produce a characteristic ring tone, buzz, or vibration depending on the alerting capabilities of the particular wireless device 10B. That notification alerts the caregiver or other person carrying the wireless device 10B to check the location or welfare of the person being monitored, that is, the person carrying the wireless device 10A, Supervisory action may also include sending a notification to the wireless device 10A being monitored. That notification could alert the person carrying the wireless device 10A that he or she has moved too far beyond the caregiver or other person carrying the wireless device 10B.

Supervisory action may also comprise contacting one or more authorized persons as at 220, in addition to the person carrying the wireless device 10B. Examples of authorized persons include one or both parents, a school administrator, or a supervisor or alternative caregiver for the person carrying the wireless device 10A. Such alerting contacts to other recipients are initiated by the monitoring service provider 20 as indicated at 32 in FIG. 1, and may include initiating one or more messages to addresses such as wireline or wireless phone numbers or IP addresses previously furnished to the monitoring service provider 20 by the subscriber. That monitoring service provider 20 may establish a hierarchy of authorized contacts, with an initial contact attempted to a first parent, and thereafter a contact to a second parent, followed by a contact to an administrator or other person if no preceding contact attempt is completed or acknowledged within a predetermined amount of time.

It is also within the purview of the present system to take supervisory action by contacting a 911 emergency call center as at 222. Any such 911 contact could also transfer the last-available location information of the wireless device 10A to the 911 center as at 224. Such emergency contact action may be appropriate only in certain situations, such as monitoring the relative geographic location of a child or an elderly person who might be unable to seek emergency assistance.

Figure 3:
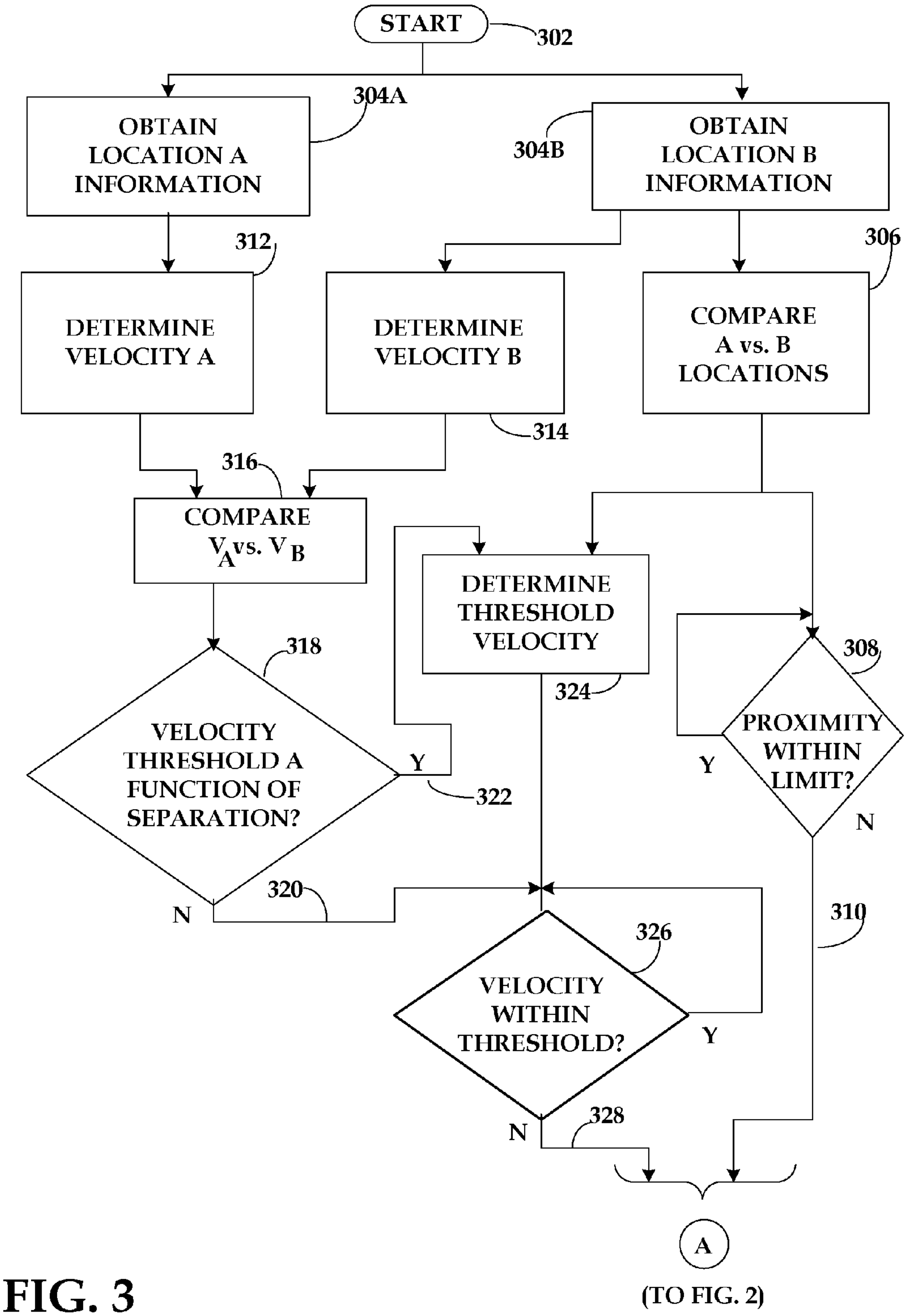
FIG. 3 is a flow chart representing operation of an alternative disclosed embodiment according to the present invention.

FIG. 3 shows another embodiment for monitoring and supervising the wireless devices 10A and 10B according to a modified embodiment of the present invention. The method shown with respect to FIG. 3, which monitors the relative velocity as well as the relative geographic location of the wireless device 10A, starts at 302 and obtains geographic location information at 304A and 304B relating to the geographic locations of the respective wireless devices 10A and 10B. Those geographical locations are compared at 306 to determine the relative geographic separation of the two wireless devices, and at 308 that relative proximity is compared with a maximum or threshold relative separation as described above for the embodiment shown in FIG. 2. If the wireless device 10A is determined to have gone beyond the maximum relative geographic separation, the process at 310 moves to note an exception as described above.

The method according to FIG. 3 also utilizes the geographic location information determined at 304A and 304B to determine the velocity of each wireless device 10A and 10B, as shown at 312 and 314 in FIG. 3. That velocity information preferably includes the direction in which the wireless device 10A is moving relative to the wireless device 10B as well as the absolute value of that movement, and may be determined using known techniques based on the geographic location information received from the wireless service provider 14 as described above. The respective velocities of the wireless devices 10A and 10B are compared at 316 to provide the relative velocity of the wireless device 10A with respect to the wireless device 10B, and it should be understood that the relative velocity may indicate closing movement (movement of the wireless devices toward each other) as well as separating movement (movement of the wireless devices away from each other).

The method of FIG. 3 determines at 318 whether the relative velocity of the wireless devices 10A and 10B should be compared to a fixed threshold, or to a variable threshold depending on the relative geographic separation of the wireless devices 10A and 10B, to determine whether that relative velocity is outside the threshold of relative velocity. A fixed threshold of relative velocity, indicated at output 320, may be a value previously entered in the database 26 and obtained from that database by the process of FIG. 3. However, if as at 322 a variable or dynamic threshold of velocity is chosen, then at 324 that variable or dynamic threshold of velocity is determined using the relative geographic separation information from the comparison 306 and based on a predetermined function of that separation information. For example, a subscriber to the present service may choose to reduce the relative-velocity threshold required to alert a person associated with the wireless device 10B, in response to an increase in the relative geographic separation between the wireless devices 10A and 10B, reasoning that the increased geographic separation may require a more rapid response by the person associated with the wireless device 10B. However, a relatively close geographical proximity of the wireless devices 10A and 10B may signify that the persons carrying those wireless devices are within visual supervision, e.g., a playground environment wherein the increased velocity of a running child should not produce an exception. The threshold velocity may also be set at the maximum absolute speed the person being monitored is likely to run, whereby exceeding that threshold absolute speed would suggest that the person was no longer moving on foot but had entered a vehicle.

With the appropriate threshold velocity determined, the relative velocity determined at 316 (and/or the absolute velocity as preferred) of the wireless device 10A, is compared at 326 to that threshold velocity. If the actual relative or absolute velocity is not within the threshold relative or absolute velocity, an output at 328 is produced to note an exception and take appropriate supervisory action on that exception as previously discussed with regard to FIG. 2. Because the embodiment described with regard to FIG. 3 may note an exception based on either or both of relative geographic separation and velocity, the corresponding notification to the wireless device 10B preferably includes an indication of the nature of the exception. Moreover, what may constitute appropriate action depends on the circumstances and the person being monitored; an appropriate supervisory action for a criminal defendant carrying the wireless device 10A (e. g, in the form of a non-removable device) would likely be different from the action to be taken when a child carrying the wireless device 10A has moved beyond a certain proximity to a caregiver associated with the wireless device 10B.

It should also be understood that the foregoing relates only to disclosed embodiments of the present invention and that numerous changes and modifications therein may be made without departing from the spirit and scope of the invention as defined in the following claims.

The present disclosure also includes a computer readable medium having stored thereon instructions which, when executed by a processor, cause the processor to perform any of the various acts described herein.

What is claimed is:

1. A method for monitoring a monitored wireless device relative to a monitoring wireless device using a monitoring system having a computer processor, the monitoring wireless device and the monitored wireless device having a relative velocity and a geographic separation, the method comprising:

comparing, at the monitoring system, the geographic separation to a geographic separation threshold;

determining, at the monitoring system, if a relative-velocity threshold is determined to be dynamic, a first value for a relative-velocity threshold using the geographic separation;

determining, at the monitoring system, if the relative-velocity threshold is fixed, a second value for a relative-velocity threshold, including decreasing a previous threshold if the geographic separation is below a certain separation;

comparing, at the monitoring system, the relative velocity to the first value if the relative-velocity threshold is dynamic and to the second value if the relative-velocity threshold is fixed; and generating, at the monitoring system, a notification if the geographic separation threshold or a relative-velocity threshold has been breached.

2. The method of claim 1, further comprising the monitoring system determining the second value for the relative-velocity threshold using the geographic separation, including the monitoring system increasing a value for the relative-velocity threshold from a previous level if the geographic separation is above a certain separation.

3. A system for monitoring a monitored wireless device relative to a monitoring wireless device, the monitoring wireless device and the monitored wireless device having a relative velocity and a geographic separation, the system comprising:

a monitoring subsystem including a processor programmed with instructions for causing the processor to:

compare the geographic separation to a geographic separation threshold;

determine, if a relative-velocity threshold is determined to be dynamic, a first value for a relative-velocity threshold using the geographic separation;

determine, if the relative-velocity threshold is fixed, a second value for a relative-velocity threshold, including decreasing a previous threshold if the geographic separation is below a certain separation;

compare the relative velocity to a first value if the relative-velocity threshold is dynamic and to the second value if the relative-velocity threshold is fixed; and generate a notification if the geographic separation threshold or a relative-velocity threshold has been breached.

4. The system of claim 1, wherein the instructions further enable the processor to, determine the first value for the relative-velocity threshold using the geographic separation, including increasing a value of the relative-velocity threshold from a previous level if the geographic separation is above a certain separation.

5. A non-transitory computer readable medium having stored thereon instructions which, when executed by a processor, cause the processor to perform a method for monitoring a monitored wireless device relative to a monitored wireless device, the monitoring wireless device and the monitored wireless device having a relative velocity and a geographic separation, and the method comprising:

comparing the geographic separation to a geographic separation threshold;

if a relative-velocity threshold is determined to be dynamic, determining a first value for a relative-velocity threshold using the geographic separation;

determining, if the relative-velocity threshold is fixed, a second value for a relative-velocity threshold, including decreasing a previous threshold if the geographic separation is below a certain separation;

comparing the relative velocity to a first value if the relative-velocity threshold is dynamic and to the second value if the relative-velocity threshold is fixed; and generating a notification if the geographic separation threshold or a relative-velocity threshold has been breached.

6. The computer readable medium of claim 5, wherein the instructions further cause the processor to determine the first value for the relative-velocity threshold using the geographic separation, including increasing a value of the relative-velocity threshold from a previous level if the geographic separation is above a certain separation.

* * * * *